(12) United States Patent
Heller, Jr. et al.

(10) Patent No.: US 7,846,575 B2
(45) Date of Patent: Dec. 7, 2010

(54) ANODE CUP AND METHODS OF FABRICATION FOR MEDICAL GRADE ELECTROCHEMICAL CELLS

(75) Inventors: Bernard F. Heller, Jr., Fridley, MN (US); Donald R. Merritt, Brooklyn Center, MN (US); Joseph P. Hartwick, Spring Lake Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 1055 days.

(21) Appl. No.: 10/903,754

(22) Filed: Jul. 30, 2004

(65) Prior Publication Data

US 2006/0024567 A1 Feb. 2, 2006

(51) Int. Cl.
*H01M 2/02* (2006.01)
*H01M 2/14* (2006.01)
*H01M 2/16* (2006.01)
*H01M 2/18* (2006.01)

(52) U.S. Cl. .................. 429/134; 429/131; 429/133; 429/179

(58) Field of Classification Search .......... 429/122–255
See application file for complete search history.

(56) References Cited

U.S. PATENT DOCUMENTS

| | | | | |
|---|---|---|---|---|
| 3,996,066 A | * | 12/1976 | Mead et al. | 429/185 |
| 4,146,685 A | * | 3/1979 | Tucholski | 429/206 |
| 4,187,328 A | * | 2/1980 | Jumel | 427/8 |
| 4,333,995 A | * | 6/1982 | Ishida et al. | 429/172 |
| 4,503,133 A | * | 3/1985 | van Lier et al. | 429/174 |
| 5,227,264 A | | 7/1993 | Duval et al. | |
| 5,350,648 A | * | 9/1994 | Kagawa et al. | 429/221 |
| 5,388,025 A | * | 2/1995 | Davis et al. | 361/502 |
| 5,435,874 A | | 7/1995 | Takeuchi et al. | |
| 5,443,602 A | | 8/1995 | Kejha | |
| 5,445,906 A | | 8/1995 | Hobson et al. | |
| 5,486,431 A | * | 1/1996 | Tuttle et al. | 429/66 |
| 5,571,640 A | | 11/1996 | Takeuchi et al. | |
| 5,744,261 A | | 4/1998 | Muffoletto et al. | |
| 6,040,082 A | | 3/2000 | Haas et al. | |
| 6,040,085 A | | 3/2000 | Cheu et al. | |
| 6,759,162 B2 | * | 7/2004 | Bennett et al. | 429/164 |
| 2004/0243183 A1 | * | 12/2004 | Norton et al. | 607/5 |

* cited by examiner

*Primary Examiner*—Dah-Wei D. Yuan
*Assistant Examiner*—Steven Scully

(57) ABSTRACT

Lithium is a soft malleable metal and sticks to most materials when a fresh surface is exposed. Currently lithium anodes are pressed in a die with temporary polymer components protecting the pressing die. During anode pressing, the lithium anode sticks to these temporary components. They facilitate easy release of the lithium anode from the die via operator intervention. The pressed anode is then manually wrapped with a micro-porous polymeric separator material and built into the battery. This process is labor intensive and would be difficult to automate. By utilizing a formed polymer cup on the anode, both the anode pressing process and separator sealing process would be simplified and have potential options for automation. The cup would allow easy release from the anode pressing die and provide some of the insulation of the anode from regions of opposite polarity.

17 Claims, 4 Drawing Sheets

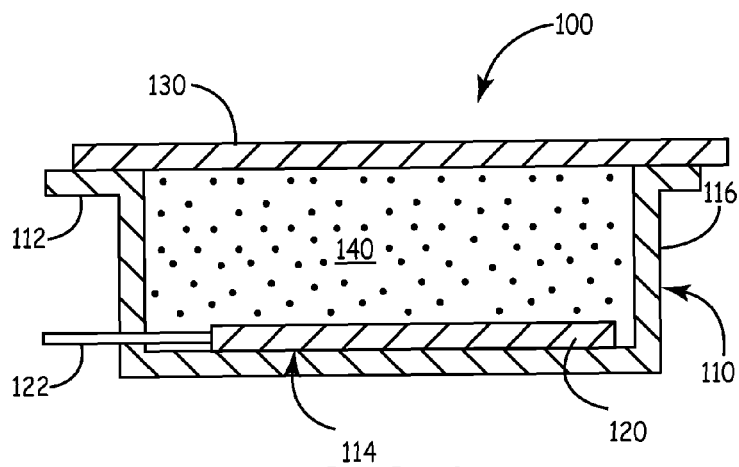
FIG. 1
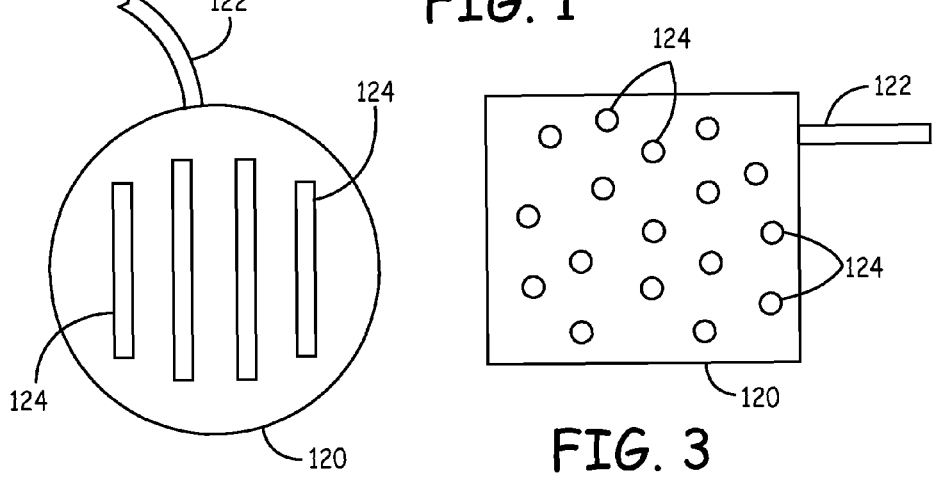
FIG. 2
FIG. 3
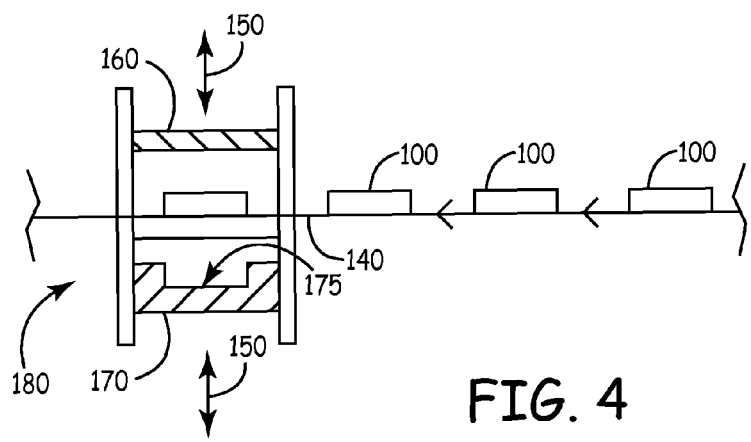
FIG. 4

ANODE CUP AND METHODS OF FABRICATION FOR MEDICAL GRADE ELECTROCHEMICAL CELLS

FIELD OF THE INVENTION

The present invention relates to electrochemical cells; in particular, apparatus and methods for automatically fabricating medical grade medium-rate batteries that power hermetically sealed implantable medical devices.

BACKGROUND OF THE INVENTION

The invention relates to an efficient fabrication process and related apparatus for processing lithium anodes for electrochemical cells, such as medium-rate medical grade primary batteries. Typically, during mass production of anodes, the anode material is manually pressed into a cavity in a die having a metallic current collector disposed therein supported by temporary polymer sheet material (e.g., release liner material) interposed to protect the die. During manual anode pressing according to the prior art the lithium material sticks to the removable polymer sheets. Following pressing of the anode the sheets are typically removed and the pressed anode is manually wrapped with a micro-porous separator material and installed in a battery enclosure.

A first polymer insert sheet surrounds the perimeter of the anode and prevents the sides of the lithium anode from contacting the (typically metallic) die during pressing. A commercially available separator sheet is placed on a major side of anode abutting the pressing ram or member. The second sheet optionally remains permanently coupled to the pressed lithium anode. A third sheet (e.g., a so-called parting sheet) approximately 0.002" thick is interposed between the face of the ram head that pushes the anode current collector—disposed at the bottom of the assembled stack—into the lithium anode.

After pressing, the polypropylene insert sheet is broken free of the sides of the anode using a peeling action and the anode is ejected from the die. The parting sheet is removed and the anode spacer is inspected for damage. The pressed anode is then ready for sealing in a suitable separator material. Using another sheet of commercially available separator material, the anode is then wrapped and placed into a sealing fixture. The separator material can be folded for ease of application and then sealed together around the periphery of the pressed anode to enclose it completely. Thus, the anode subassembly is essentially complete and can be combined with suitable electrolyte and cathode within a sealed enclosure, which for medical devices is typically formed of titanium, stainless steel or the like.

Inherently, the traditional process just described is extremely labor intensive, with discrete variable highly controlled processing requiring the full attention and effort of anode fabrication engineers.

Thus, a need exists in the art to automate the fabrication of anodes to decrease costs, process steps and lot variability with a concomitant increase in manufacturing yield, consistency and quality.

SUMMARY OF THE INVENTION

According to the present invention an automated anode processing apparatus and methods are implemented to simplify anode pressing and separator wrapping or sealing of the pressed anode. The invention provides for a manufactured-in-place approach to anode subassembly fabrication wherein the processing substrate, or pallet, comprises an integral part of the finally assembled anode.

In one form of the invention, a resin-based, pre-dimensioned anode receiving cup having a substantially or completely continuous major lower surface and enclosed side walls and an major opening opposing the major lower surface receives a finished current collector. With the anode current collector disposed abutting the major lower surface a desired amount of anode material (e.g., lithium metal material) is filled into the anode cup and the major opening covered with a suitable electrochemical cell separator material. The entire anode subassembly is then pressed (preferably in a correspondingly dimensioned die) with an articulated ram head or other compression-applying apparatus so that after pressing is completed an integrated finally-assembled pressed anode results. Thus, according to the invention there is no need for manual peeling of polymer sheets or excess sheet material needed to protect the die or pressing ram head from the anode material.

The structure of the self-contained anode assembly inherently provides opportunities for automated mass production of the anode structures. In this form of the invention, an apparatus and associated processing steps are implemented to i) pick and place a suitable current collector into each discrete hollow anode cup, ii) dispense anode into the cup to a desired volume, mass and/or height relative to the side walls of said cup, iii) place at least one layer of separator material over the anode material and the upper edges of the cup, and iv) press or compress the assembly and either inspect or convey the pressed anode subassembly to another location for further battery assembly.

With respect to the current collector element, a solid, screen, slotted, or perforated metallic member may be used. The perforation(s) may comprise one or more geometric and/or irregular holes formed or provided in a metallic substrate. The current collector can be picked up with one or more of: a magnetic work piece, a vacuum-assisted work piece, a pair of mechanically articulated opposing members, a gravity assisted rail member and the like.

With regard to dispensing the anode material into the anode cup, pre-cut discrete sheets if appropriate dimensions can be conveyed proximate the upper major opening of the cup and deployed or dropped into the cup. A slug of anode material sized to be placed near the center of a cup and rise slightly above the peripheral edges could be dispensed into the cup. In this form of the invention, the separator material would initially slightly adhere to the anode material thus improving alignment of the separator until the subassembly was pressed.

With regard to the anode cup any appropriately electrically insulative material can be utilized (e.g., polypropylene, rubber, extruded or molded thermoplastic, and the like). The material should be suitably resilient so that it withstands compression while maintaining its shape for final insertion into an enclosure for an electrochemical cell. The anode cup can be formed to conform to any arbitrary shape including curves, angled surfaces, dimpled surfaces and the like. In one aspect of the invention, the current collector is non-planar and conforms to a substantially non-planar major lower surface of the anode cup.

The following drawings are not drawn to scale and common reference numerals are utilized to refer to like elements throughout the written description. Of course, the invention is not limited to the illustrate embodiments but rather only by the appended claims which define the literal metes and bounds of the claims, and equivalents thereof.

BRIEF DESCRIPTION OF THE DRAWINGS

FIG. 1 depicts an embodiment of an anode cup in a cross-sectional elevational view following fabrication and pressing procedures according to the present invention.

FIG. 2 is a plan view of a current collector having a conductive tab coupled thereto which can be used in one form of the invention.

FIG. 3 is a plan view of a current collector having a conductive tab coupled thereto which can be used in another form of the invention.

FIG. 4 schematically depicts an anode pressing work station, which receives at least one partially assembled anode at a time and compresses it together to render the inventive anode cup apparatus.

DETAILED DESCRIPTION OF THE ILLUSTRATED EMBODIMENTS

Figure 5:
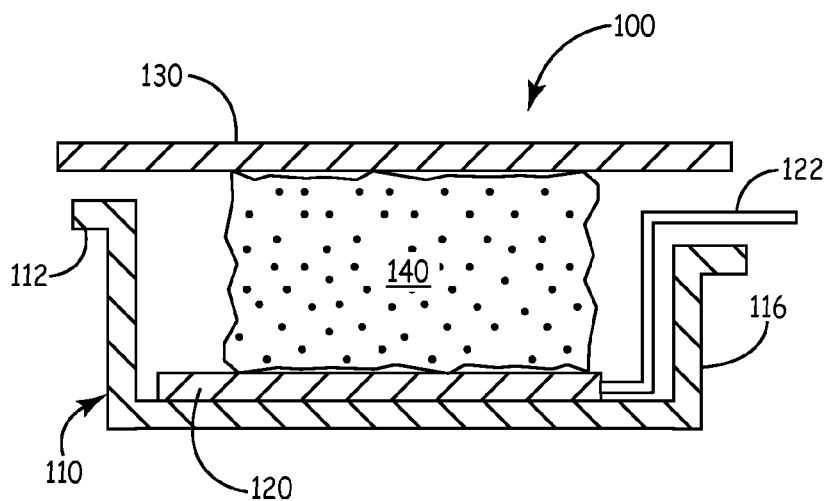
FIG. 5 depicts an embodiment of an anode cup according to the present invention in a cross-sectional elevational view prior to pressing the anode material into the cup.

Referring now to FIG. 1, which depicts an embodiment of an assembled anode cup assembly 100 in a cross-sectional elevational view (following fabrication and pressing procedures) according to the present invention. In the embodiment depicted in FIG. 1 a substantially prismatic anode cup 110 includes a substantially or completely continuous major lower surface 114 joined to side walls 116 that together define a major upper opening. The major upper opening can optionally be further defined by ledge- or shelf-portion 112. The portion 112 can extend from the upper portion of one or each side wall 116. In the depicted embodiment, an upper surface of the portion 112 provides a substantially planar surface but the portion 112 could be non-planar and/or one or more of discrete portions coupled to a portion of a side wall 116. A current collector 120 is disposed within the anode cup 110 proximate or near the major lower surface 114 and at least one tab member 122 couples to the current collector 120. The tab member 122 depicted in FIG. 1 threads through an aperture, slot or a relatively thin portion of a side wall 116, or the like, and/or the tab member can extend up a side wall 116 and exit the anode cup 110 from an upper portion thereof (and, as applicable, over the shelf member 112). The tab member 122 provides operative connection for an electrochemical cell as is known and used in the art. The current collector 120 comprises an electrically conductive material, including nickel, titanium, platinum, silver or the like. A mass of anode material 140 substantially fills the anode cup 110 and abuts the current collector 120. The anodic material may comprise any one of the known positively charged materials typically implemented in primary and secondary electrochemical cells including without limitation, lithium, lithium-ion, calcium, aluminum, sodium, and mixtures thereof and the like. With respect to passive electrochemical cells, such as high energy density electrolytic cell, the anodic material 140 can comprise materials such as aluminum, tantalum, niobium, vanadium and other valve metals. Also depicted in FIG. 1 is at least one sheet of a porous separator layer 130 abutting the anode material 140 and at least a portion of the shelf portion 112. The separator layer 130 can comprise any appropriate material that allows ions to pass between the anode material 140 and any suitable cathode material (not shown). Such materials are well known in the art and include materials distributed by Celgard Inc. of Charlotte, North Carolina, under the Celgard® Flat Sheet Membrane trademark. One appropriate material includes the Celgard model 4560 product, although many other suitable materials are readily available, including kraft paper, cellulose, EPTFE impregnated material, a Teflon® impregnated sheet material, perforated polypropylene and/r polyurethane, non-woven materials, and the like.

FIG. 2 is a plan view of a current collector 120 having a conductive tab 122 coupled thereto which can be employed in one form of the invention. The current collector 120 depicted in FIG. 2 includes a plurality of elongated apertures 124 formed within the major surface of the current collector 120, although a non-perforated current collector 120 (such as depicted in cross-section in FIG. 1). In addition, while not specifically depicted, a current collector 120 can comprise more than one sheet of conductive material with at least one of the sheets of material disposed at an elevation within the anode material 140. Alternatively, a current collector 120 comprising a plurality of metallic rods or tubes wherein the rods or tubes are disposed within the anode material 140 and/or disposed abutting the interior major lower surface 114 of an anode cup 110 is contemplated according to the present invention. The current collector 120 depicted in FIG. 2 can be used in conjunction with a generally circular major lower portion 114 of an anode cup 110 or with a prismatic (e.g., rectangular-, square-, trapezoidal-shaped, etc.) major lower portion 114.

FIG. 3 is a plan view of a current collector 120 having a conductive tab 122 coupled thereto which can be used in another form of the invention. FIG. 3 is a plan view of a current collector 120 having a conductive tab 122 coupled thereto which can be employed in one form of the invention. The current collector 120 depicted in FIG. 3 includes a plurality of apertures 124 formed within the major surface of the current collector 120, although a non-perforated current collector 120 having similar shape to that depicted in FIG. 1. The current collector 120 depicted in FIG. 3 can be used in conjunction with a generally circular major lower portion 114 of an anode cup 110 or with a prismatic (e.g., rectangular-, square-, trapezoidal-shaped, etc.) major lower portion 114 such as that depicted in FIG. 1.

FIG. 4 schematically depicts an anode pressing work station 180 which receives at least one partially assembled anode cup 110 at a time (e.g., such as the anode assembly depicted in FIG. 1) and compresses it together to render the inventive anode cup apparatus 100. The pressing work station 180 can be operated manually, semi-manually or automatically. In one form of the invention a conveyor belt 140 under motion control in the X-Y and optionally Z-axis directions or a roller-based conveyance (not depicted) can be used to align at least one anode assembly 100 into position at the anode pressing work station 180. The work station 180 comprises supporting structure for vertical movement 150 of at least one of upper arm 160 or lower arm 170 to provide compression to the assembly 100. The arms 160,170 can be manually actuated with a lever or the like, or articulated under microprocessor control (e.g., driving a servo motor coupled to one or more linear actuators such as an elongated threaded shank). Optionally, one or both arm 160,170 can include a cut-out portion 175 and/or in lieu of a cut-out portion 170 an anode pressing die 170 having dimensions based on the dimensions of the anode assembly 100. Either or both arms 160,170 can include one or more transducers or components to provide a signal related to the magnitude of at least one of the applied force, the time the force is applied, the displacement, velocity or acceleration of the arm (or arms 160,170), the temperature of the arms 160,170 and/or the die 170, and the like. In addition, the work station 180 can include machine vision systems coupled to motion control components so that the alignment of the anode assembly 100, dimensions or tolerances achieved, and/or quality of the finished assembly 100 can be determined and, as necessary, the working parts of the work station 180 adjusted. Further, the arms 160,170 work station 180 can support a plurality of anode pressing dies 175 and the scale of production increased accordingly.

FIG. 5 depicts an embodiment of an anode cup 110 according to the present invention in a cross-sectional elevational view prior to pressing the anode material into the cup 110. In FIG. 5 a form of the invention is depicted, wherein the collector tab 122 positioned along the side wall 116 and extending between shelf portion 112 and separator layer 130 of the anode assembly 100. Also depicted in FIG. 5 is a pre-pressed or green slug of anode material 140. The anode material initially does not significantly make contact with the interior of side wall 116 and rises above the plane defined by the upper surface of shelf-portion 112 so that the separator layer 130 temporarily "tacks" to the exposed upper portion of anode material 140. At the same time, due to the mass of anode material 140 the current collector 120 remains in position as well. Thus, when the anode subassembly 110 is compressed (e.g., using work station 180 or equivalent structure) the anode material 140 deforms into substantial contact with the interior of side walls 116, current collector 120 and separator layer 130 (e.g., as depicted in FIG. 1). Of course, more than one separator layer 130 can be utilized and the current collector can be sized to cover a portion of side wall 116.

Figure 6:
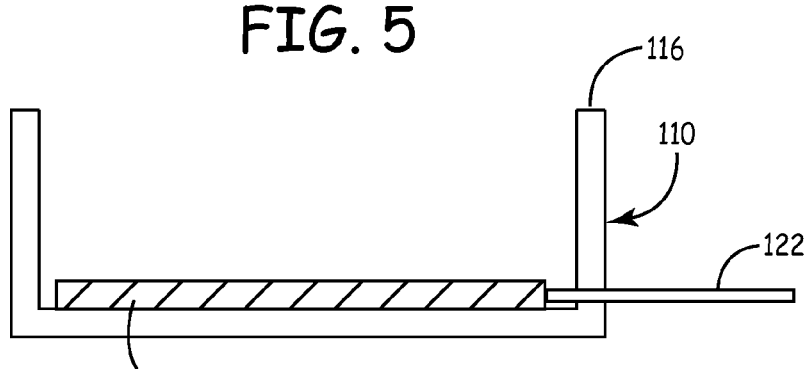
FIG. 6 is a cross-sectional elevational view of a substantially prismatic anode cup usable in conjunction with certain embodiments of the present invention.

FIG. 6 is a cross-sectional elevational view of a substantially prismatic anode cup 110 usable in conjunction with certain embodiments of the present invention. In the embodiment depicted, the anode cup 110 is devoid of shelf-like features at the periphery of the major opening. A current collector 120 is diposed abutting the major lower surface of the anode cup 110 and a tab member is threaded through a portion of the side wall 116 of cup 110.

Figure 7:
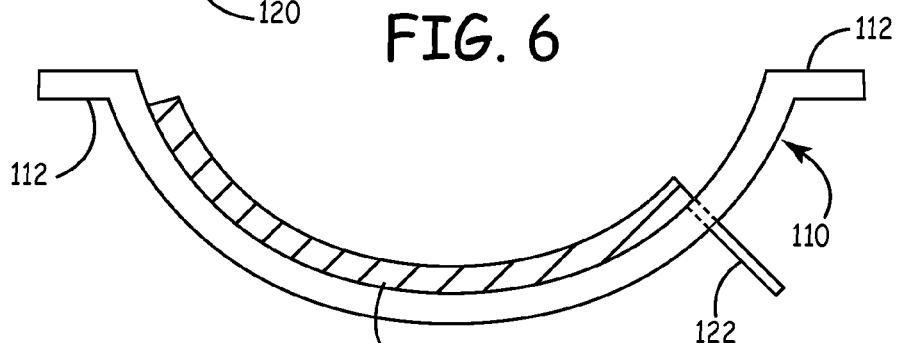
FIG. 7 is a cross-sectional elevational view of a curvilinear anode cup usable in conjunction with certain non-prismatic configurations of select embodiments of the present invention.

FIG. 7 is a cross-sectional elevational view of a curvilinear anode cup 110 usable in conjunction with certain non-prismatic configurations of select embodiments of the present invention. In the embodiment depicted, the anode cup 110 is a generally constant radius curved member (in cross section) with a conformal current collector 120 and a tab member threaded through a portion of the anode cup 110. Optional shelf-like features 112 form a substantially planar surface and aid in the alignment of separator material prior to compressing the anode subassembly (110) according to the invention.

Figure 8:
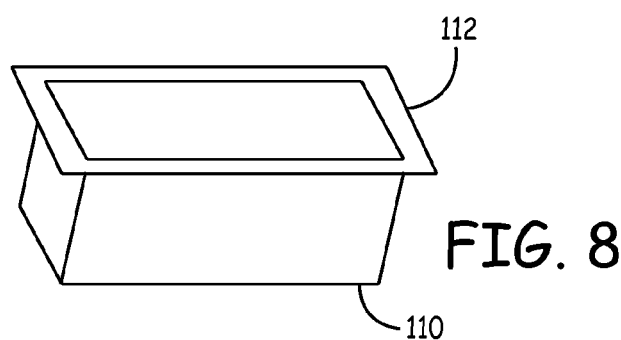
FIG. 8 is perspective view depicting an embodiment of an anode cup according to the invention.

FIG. 8 is perspective view depicting an embodiment of an anode cup 110 according to the invention. The generally rectangular anode cup 110 includes a continuous, substantially flat shelf-portion around the entire periphery of the major opening of the anode cup 110.

Figure 9:
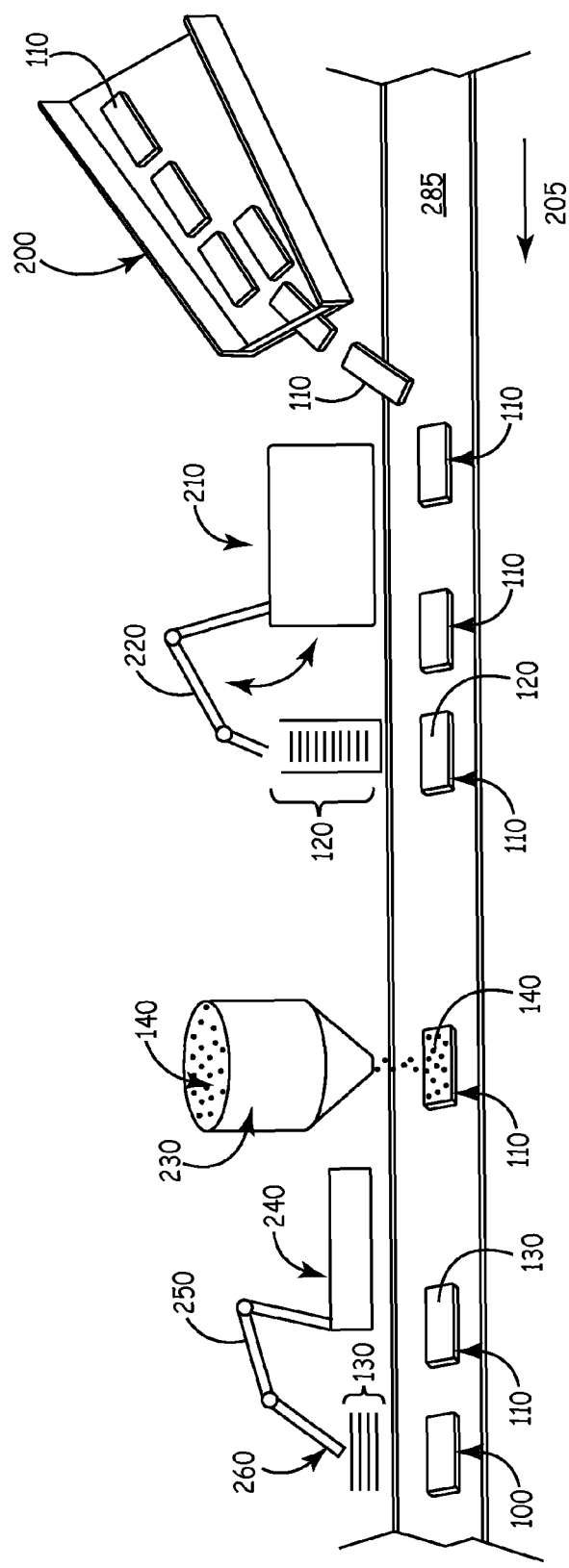
FIG. 9 schematically depicts certain anode cup pre-assembly (i.e., fabrication procedures prior to the final pressing of the anode slug) wherein several discrete work stations cooperate to assemble anodes according to one aspect of the invention.

FIG. 9 schematically depicts certain anode cup 110 pre-assembly (i.e., fabrication procedures prior to the final pressing of the anode slug 140) wherein several discrete work stations 200,210,230,240 cooperate to assemble anodes according to one aspect of the invention. As indicated by arrow 205, the direction of processing begins with work station 200. At work station 200 a plurality of anode cups 110 are meted out to a conveyor belt 285, which moves the anode along the conveyor belt 285 to work station 210. At work station 210 a pick and place automated arm 220 (and/or manual labor) pick up a discrete current collector 120 and places it in a corresponding anode cup 110. The anode cup and current collector sub-assembly are then filled with anode material 140 at work station 230. The anode material can be dispensed from a reservoir, cut from a sheet, provided as a slug of material having dimensions to wholly fit inside the cup when compressed thereinto. The anode sub-assembly then moves to work station 240 wherein an articulated member 260 at the end of the automated arm 250 operates to place at least one layer of separator over the major opening and in contact with the anode material 140. Then the anode sub-assembly can be compressed so that operative communication is established between the components thereof.

Figure 10:
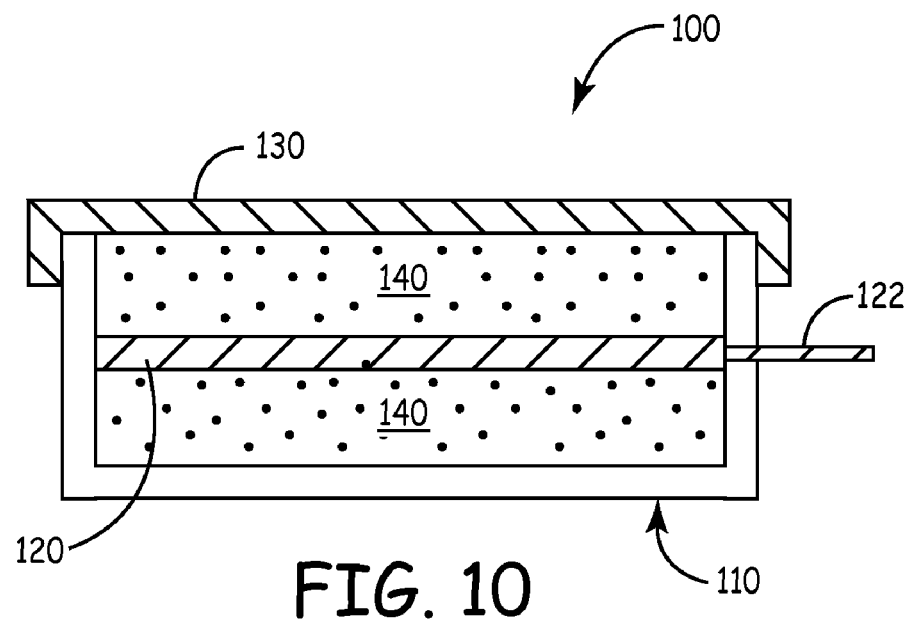
FIG. 10 depicts a cross-sectional elevational view of an embodiment of the invention wherein a substantially planar current collector is disposed intermediate two major volumes of anode material.

FIG. 10 is a cross-sectional elevational view of an embodiment of the invention wherein a substantially planar current collector 120 is disposed intermediate two major volumes of anode material 140. The methods of fabrication of this embodiment are very similar to the other methods described, depicted and claimed herein. However, the first major volume of anode material 140 is deposited into an empty anode cup 100 and then a current collector is placed on top of the first volume of anode material 140. A second major volume of anode material 140 is then placed on top of the current collector 120 before a layer of separator material is placed over the major opening of the anode cup 110. The sub-assembly is then compressed as described elsewhere herein.

Figure 11:
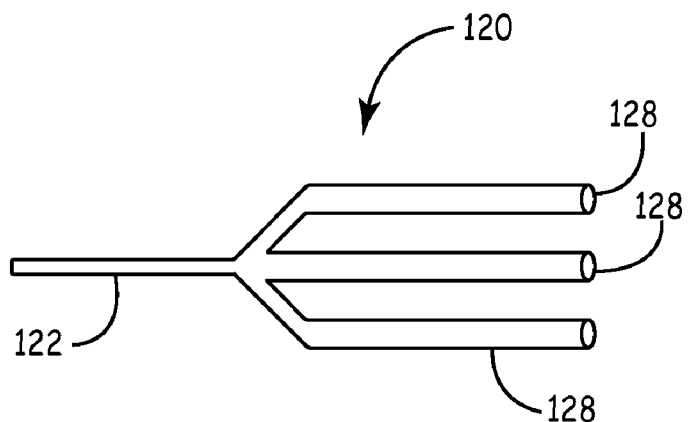
FIG. 11 depicts a perspective view of an embodiment of a current collector having a plurality of elongated portions.

FIG. 11 is a perspective view of an embodiment of a current collector 120 having a plurality of elongated portions 128 that can be utilized in lieu of other current collector configuration described, depicted and/or claimed herein. The current collector depicted can be placed in contact with the major lower portion of the cup 110 and the anode material added on top of it or it can be inserted into the anode material 140 after the material has been added to the cup 110. Alternatively, the current collector 120 can be disposed intermediate two major volumes of anode material. Also, while not specifically depicted herein, one or more bosses can be formed within the anode cup 110 to assist accurate and consistent placement of the current collector 120. For example, minor bosses or protrusions formed in a molded anode cup 110 if disposed on or near the side wall(s) or major lower surface can help retain a current collector 120 in a desired location (e.g., slightly spaced from the interior of the side wall).

Having described and depicted the substance of the core inventive concepts, the inventors now turn to a few alternative embodiments for the production, configuration and use of said inventive concepts. In addition to the prismatic and curved configuration of the anode cups of the current invention, tapered, multi-level, and concave shapes, among others may be implemented without departing from the invention. Also, in one form of the invention the taller upper shelf features or upper periphery of the cup can be elevated above the anode material disposed within the cup. In this form of the invention, the exposed upper side wall portions can be used to align and/or guide the coupling of anode to cathode. Also, in the process of fabricating anodes according to the invention the cup can be fabricated in situ adjacent the rest of the processing equipment. In this aspect of the invention any appropriate mode of fabrication can be utilized (e.g., cold forming, vacuum drawn, molded, pressed, punched, etc.).

In another embodiment, the cup member itself comprises separator material and/or is lined with separator material so that only the then-shaped anode material and separator material is coupled to a cathode within the electrochemical cell enclosure. In this embodiment of the invention, optionally more than one layer or a heavier or thicker separator layer can be utilized around the side walls and major lower surface of the cup or to support the corresponding structure in the event that no actual cup is present.

The present invention has been described with reference to a few discrete embodiments but is not to be construed as so limited. As those of skill in the art appreciate the various components of the invention can be substituted or modified slightly without departing from the scope of the invention herein disclosed. Indeed, the invention is defined by the appended claims, which define the true metes and bounds thereof, as well as equivalents thereof.

The invention claimed is:

1. A method of manufacturing an anode assembly, said anode assembly characterized by an electrically insulative cup, said cup having a major opening, a current collector disposed within the interior of the cup, a volume of anode material disposed within the interior of the cup and in electrical communication with the current collector, and a portion of separator material disposed across at least a majority of said major opening, wherein the separator material comprises at least one layer of one of the group: a perforated polypropylene material, a perforated polyurethane material, a non-woven material, the method comprising:
   inserting a current collector into the cup;
   threading a tab member coupled to the current collector to a location outside the periphery of the cup;
   filling at least a majority of the cup with an anode material comprising lithium;
   aligning a layer of separator material over the major opening;
   contacting the separator material with a pressing die; and
   applying force to the pressing die and compressing the separator material against the anode material until the anode material deforms to establish electrical communication with the current collector and the layer of separator material and thereby forming an integrated pressed anode assembly comprising the cup, the current collector, the deformed anode material and the separator material.

2. A method according to claim 1, wherein the current collector comprises a substantially planar member disposed adjacent a major cup surface.

3. A method according to claim 2, wherein the major cup surface comprises a lower portion of the cup.

4. A method according to claim 1, wherein the threading step comprises at least one of: threading the tab member through a slot formed in the cup, threading the tab member up a side of the cup and through the major opening, threading the tab member through a region of the cup having a relatively reduced thickness.

5. A method according to claim 1, wherein the current collector comprises one of a substantially planar and at least one elongated member.

6. A method according to claim 5, wherein the substantially planar current collector has at least one aperture formed therein.

7. A method according to claim 1, wherein the current collector is disposed in at least one of the following locations: a lower surface of the cup, an intermediate location between the major opening and the lower surface of the cup, abutting a side wall of the cup.

8. A method according to claim 1, wherein the current collector further comprises an electrical tab coupled to a portion of the current collector and extending through one of: the side wall, the major opening, the lower surface.

9. A method according to claim 1, wherein the cup is fabricated from one of: a resin-based material, a thermoformed material, an injection molded material.

10. A method according to claim 1, wherein the cup is fabricated of a polyolefin material.

11. A method according to claim 10, wherein the cup is fabricated of one of the group: a polypropylene material and a polyethylene material.

12. A method according to claim 1, wherein the cup is configured as one of: a prismatic shaped vessel and a vessel having at least one substantially curved portion.

13. A method according to claim 12, wherein at least a portion of the periphery of the cup includes a substantially flat shelf portion and the separator material abuts at least part of the shelf portion.

14. A method according to claim 13, wherein the portion of separator material overlaps opposing sections of the shelf portion.

15. A method according to claim 1, wherein the major opening has one of a square shape, a rectangular shape, a triangular shape.

16. An anode assembly according to claim 1, wherein the cup comprises at least one layer of a separator material.

17. A method according to claim 1, wherein the cup comprises at least one layer of a separator material.

* * * * *